United States Patent [19]

Spearman et al.

[11] Patent Number: 4,836,931
[45] Date of Patent: Jun. 6, 1989

[54] REINFORCED FILTER TUBE AND METHOD OF MAKING THE SAME

[75] Inventors: Michael R. Spearman, St. Paul; Patrick R. Spearman; Daniel M. Spearman, both of Shoreview, all of Minn.

[73] Assignee: Porous Media Corporation, St. Paul, Minn.

[21] Appl. No.: 852,544

[22] Filed: Apr. 16, 1986

[51] Int. Cl.⁴ .......................................... B01D 27/08
[52] U.S. Cl. .................. 210/484; 210/489; 210/496; 210/497.2
[58] Field of Search ............... 210/484, 485, 489, 492, 210/496, 497.2, 504, 508, 505, 483, 437, 446, 493.2; 55/526, 527

[56] References Cited

U.S. PATENT DOCUMENTS

| | | | |
|---|---|---|---|
| 2,911,101 | 11/1959 | Robinson | 210/489 |
| 3,026,609 | 10/1959 | Bryan | 210/483 |
| 3,253,715 | 5/1966 | Painter et al. | 210/496 |
| 3,460,680 | 8/1969 | Domnick | 210/457 |
| 3,708,965 | 1/1973 | Domnick | 55/488 |
| 4,052,316 | 10/1977 | Berger, Jr. et al. | 210/315 |
| 4,078,965 | 3/1978 | Berger, Jr. et al. | 264/87 |
| 4,124,360 | 11/1978 | Berger, Jr. et al. | 55/527 |
| 4,157,968 | 6/1979 | Kronsbein | 210/503 |
| 4,239,627 | 12/1980 | Wada | 210/484 |
| 4,402,830 | 9/1983 | Pall | 210/493.2 |
| 4,539,107 | 9/1985 | Ayers | 210/437 |
| 4,588,500 | 5/1986 | Sprenger et al. | 210/489 |

*Primary Examiner*—Richard V. Fisher
*Assistant Examiner*—Coreen Y. Lee
*Attorney, Agent, or Firm*—Gifford, Groh, Sheridan, Sprinkle and Dolgorukov

[57] ABSTRACT

There is disclosed a porous, vacuum formed filter tube having randomly oriented glass fibers and having at least one layer of a suitable sheet material wrapped around said porous filter tube and being in intimate contact therewith, said disclosed combination having an outer support structure of a predetermined inside diameter sufficient to compress the assembly of said porous filter tube and said material when it is slipped thereover, thus providing compression from the outside to the inside and forcing the layer of sheet material into intimate contact at virtually all points with said porous filter tube.

20 Claims, 3 Drawing Sheets

REINFORCED FILTER TUBE AND METHOD OF MAKING THE SAME

BACKGROUND OF THE INVENTION

1. Field of Invention

The present invention relates to an improved reinforced coalescing filter tube which may be used in virtually any coalescing filter assembly, and more particularly relates to a coalescing filter tube having a layer of nonwoven material interposed between a vacuum formed filter layer and a reinforcing structure to prevent expansion of the vacuum formed filter layer into the openings in the support structure during use, a situation which has been found to be undersireable because the packing density and, therefore, the pore size of the filter at the openings in conventional constructions has been found to be larger than the packing density and pore size elsewhere in the filter. In addition, the providing of the layer of nonwoven material gives added support in high differential pressure situations.

2. Description of the Prior Art

Most tubular filters of the type with which the present invention is concerned are made for use in filter housings, and are used to flow either in-to-out or, from the outside in. While it is advantageous to flow from the outside in for many filter applications, there is also a definite advantage for flowing in-to-out for certain applications. For example, the coalescing of liquid droplets and aerosols from gases, or the coalescing of two liquid phases. In these applications, it is desireable to have an external support structure to support the filter media and thereby prevent media rupture caused by high differential pressure across the filter. Such external support structures are usually made of metal or plastic.

Filter tubes of this type are commonly manufactured by applying a vacuum to the inside of a porous mandrel and submerging the mandrel in a slurry of fibers of various compositions. The composition of the slurry determines the pore size of the filter. Because of the vacuum applied to the mandrel, the fibers in the slurry are deposited on the surface of the mandrel, the mandrel is then removed from the slurry, and after any free or excess water is removed, a filter tube is left on the mandrel.

The inside diameter of the filter tube is very consistant from filter tube to filter tube because the inside diameter of the tube is a function of the outside diameter of the mandrel. It, additionally, is very smooth and uniform in appearance because it is formed against the mandrel.

However, the outside diameter not only is not uniform, but is very rough in appearance because it does not have any similar structure to form against. This has produced a serious problem in the art of how to apply a support structure to the outside of the tube, and have it in contact with said tube at all points, so that the filter tube does not rupture when pressure is applied thereto.

In order to prevent the filter tube from bursting, it is essential that the filter media is supported by an external support structure in relatively intimate contact with the media. The optimum situation would be to have a support structure in contact with the filter media at an infinite number of points around the outside diameter of the filter tube. However, previous attempts in providing outer support structures have not been entirely satisfactory.

Basically, four methods have been tried. The first method involved placing an outer support structure loosely over the filter media. However, this method does not provide close intimate contact between the filter media and the support core. Thus, rupture of the filter media was very likely to occur at even low differential pressures across the filter media in the neighborhood of 10 to 25 PSID.

The second method involved compressing the filter media between an inner rigid support core and an outer rigid support. This method requires both an internal and an external support structure to be utilized, with said outer support structure having a clapping means for maintaining its position relative to the inner support structure, and for maintaining compression of the filter media. An example of this method can be seen in the U.S. Pat. No. 3,460,680 to Domnick. This method usually required stainless steel support structures for prevention of corrosion, and while it is used to the present day, it is very costly to manufacture, and still does not permit total contact between the filter media and the support structure. For this reason, it is still not satisfactory for many applications.

A third method, involving placing a rigid support structure over the tube without any outward force applied from the inside of the filter tube was tried. However, this method suffers from two deficiencies. There is (1) a lack of intimate contact between the filter media and the support structure, or (2) if the support structure is too small in relation to the outer diameter of the filter tube, there is damage to the filter media while attempting to slip on a support structure. Thus, this method still leaves a serious problem in the prior art.

The latest attempt at solving these problems in the art involves a fourth method where the filter media is brought in intimate contact with a rigid outer support core as a result of an outwardly directed force having been supplied to the internal surface of the filter media during the manufacturing process. One embodiment of this method can be seen in the U.S. Pat. No. 4,052,316 to Berger et. al. This method utilizes a continuous rigid support structure, such as a plastic or metal perforated core, which is slipped over the filter media while the media is still under vacuum on a mandrel. After the tube has been slipped over the media, the vacuum is released, and an outward pressure of air forces the media into intimate interlocking contact with the outer support structure. It actually forces the media into the openings of the support core for an interlocking contact.

The pore size and structure of a filter media is a function of the relative surface area of that filter media which, in turn, is a function of the median fiber diameter and packing density. In those areas where the filter media has been forced into the openings of the outer support structure, the thickness of the media will be greater than the adjacent media which is in contact with the support structure (see FIG. 2). Hence, the packing density of the filter media in the opening will be less than the packing density of the filter media in contact with the support structure, and this creates a lack of uniformity in the filter media with regard to pore size and structure.

Additionally, there is a lack of support of the filter media in the openings of the outer support structure. Therefore, when higher differential pressures are applied from the inside to the outside of the filter media, distortion, or even rupture, of the filter media will occur sooner than in supported areas.

SUMMARY OF THE INVENTION

To solve the problems in the prior art, a porous vacuum formed filter tube is provided having randomly oriented glass fibers with at least one layer of a suitable sheet material wrapped around said porous filter tube and being in intimate contact therewith, said combination having an outer support structure of a predetermined inside diameter sufficient to compress the assembly of said porous filter tube and said sheet material when it is slipped thereover, thus providing compression from the outside to the inside, and forcing the layer of sheet material into intimate contact at virtually all points with said porous filter tube.

Thus, it is one of the objects of the present invention to provide a tubular filter having an external support structure in relatively intimate contact with the media at an infinite number of points around the outside diameter of the tube.

A further object of the present invention is to provide a tubular filter having an external support structure, and having a uniform wall thickness throughout the entire filter tube.

A still further object of the present invention is to provide a tubular filter having an external support structure, and having a nonwoven sheet material interposed between said tubular filter and said external support structure to provide a filter tube having a relatively uniform wall thickness, and being in intimate contact with virtually all points of said nonwoven material which, in turn, is supported by a rigid outer support structure.

A still further object of the present invention is to provide a filter of the foregoing nature wherein said sheet material is of a spun bonded structure having high tensile and tear strength, excellent dimensional stability, no media migration, and good chemical resistance.

A still further object of the present invention is to provide a filter tube having both an external support structure and an internal support structure.

A still further object of the present invention is to provide a filter tube of the foregoing nature, whether or not also supported internally, and having an external drain layer.

Another object of the present invention is to provide a filter tube of the foregoing nature which may be easily installed in commercially available filter assemblies.

Further objects and advantages of this invention will be apparent from the following description and appended claims, reference being had to the accompanying drawings forming a part of the specification, wherein like reference characters designate corresponding parts in the several views.

It is to be understood that the invention is not limited in its application to the details of construction and arrangement of parts illustrated in the accompanying drawings, since the invention is capable of other embodiments, and of being practiced and carried out in various ways within the scope of the claims. Also, it is to be understood that the phraseology and terminology employed herein is for the purpose of description, and not of limitation.

Figure 1:
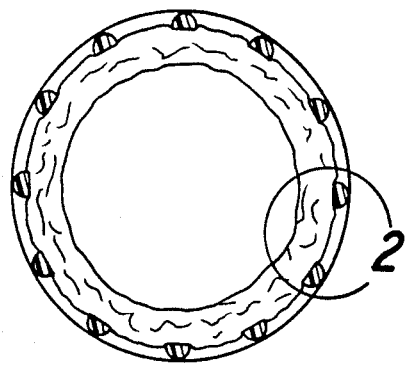
FIG. 1 is an end view of a prior art filter tube, showing the intimate interlocking contact between the outer support structure and the filter tube.
Figure 2:
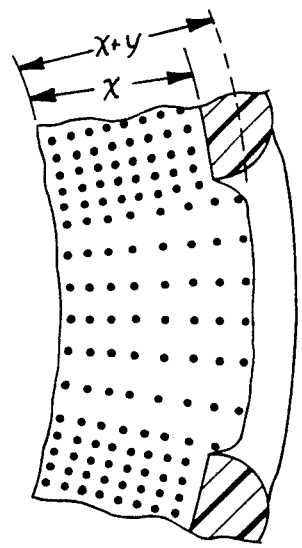
FIG. 2 is an enlarged sectional view of the prior art shown in FIG. 1, showing how the packing density of the filter media varies in the portions of the filter tube which have expanded out into the openings of the outer support structure of the prior art tube.

Referring to FIGS. 1–4, the available prior art filters, and the filter of the present invention can be viewed for comparison purposes. FIGS. 1 and 2 show the prior art devices.

As can be seen in FIG. 2, the placing of an outer support structure around a vacuum formed filter tube, and then releasing pressure and/or applying a positive outward pressure does force the filter media into the openings of the outer support structure for a distance of Y. Where this happens, the packing density and, thus, the pore size of the filters becomes much greater, and is not uniform, as compared to the density of the filter tube where it is supported at all points by the support structure.

Figure 3:
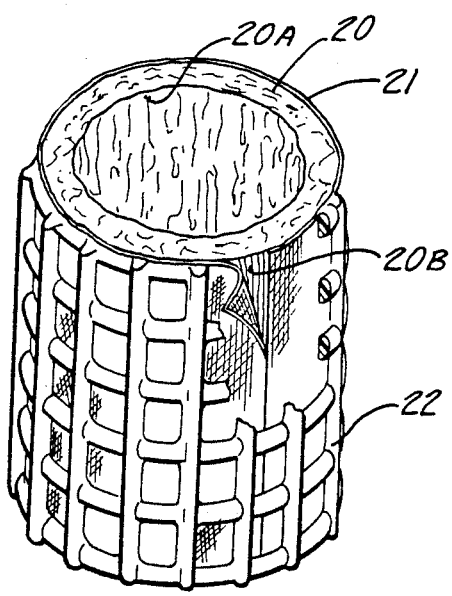
FIG. 3 is a perspective view, partially broken away, showing a construction embodying our invention.
Figure 4:
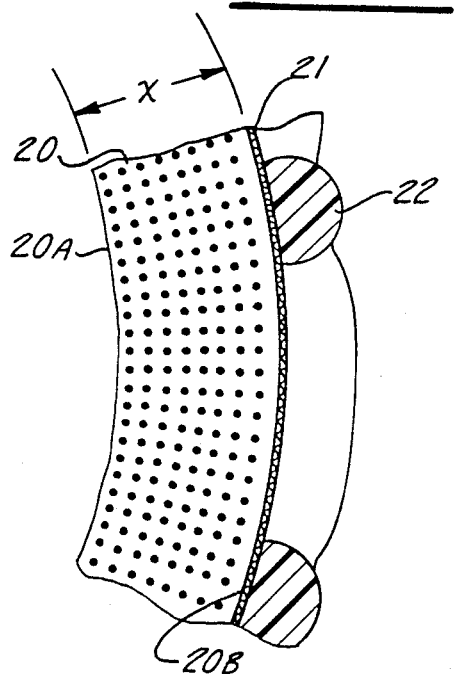
FIG. 4 is an enlarged view, partly in section, of the construction shown in FIG. 3 showing how the addition of the wrapped layer between the filter tube and the outer support core of a construction embodying our invention maintains uniform packing density of the filter tube.

In contrast, the filter of the present invention can be seen by referring to FIGS. 3–4. If a filter tube with an outer support structure only is desired, this is shown in FIG. 3, wherein there is shown a filter tube 20, surrounded by a layer of nonwoven media 21, which is surrounded by an outer support structure 22. It can be seen that the inner wall 20A of the filter tube is uniform because of the fact that it is supported on a mandrel while forming. The outer wall 20B is also kept relatively uniform because it is wrapped with the nonwoven media 21 while still wet. The outer support structure 22 is slipped over the combination of the filter tube 20, and the nonwoven media 21, after the vacuum forming process takes place, as will be explained hereinafter.

Figure 6:
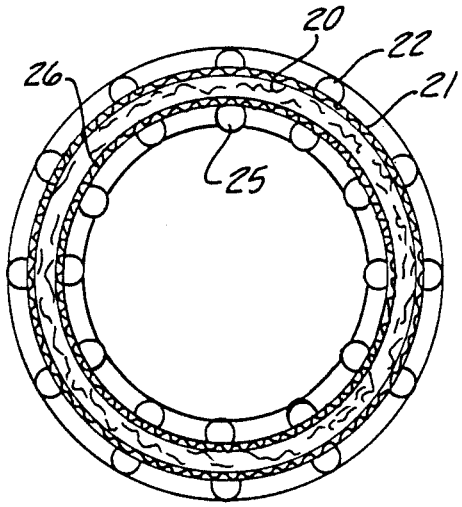
FIG. 6 is an end view of a modification of the construction shown in FIG. 4 where, in addition to the outer support structure, there is provided an inner support structure having an inner layer of sheet material between it and the filter tube.

FIG. 6 shows the construction of the present invention when an inner support structure is also desired. In this case, an inner support structure 25 is first provided which is wrapped with an inner layer of nonwoven media 26, after which the filter tube 20, the nonwoven media 21, and the support structure 22, previously described, are provided.

Of course, it should be understood that it is well within the scope of the present invention to provide the inner support structure 25, and the inner layer of nonwoven media 26, having a filter tube 20 formed thereon, without providing the outer layer of nonwoven media 21, and the outer support structure 22, if desired.

Figure 5:
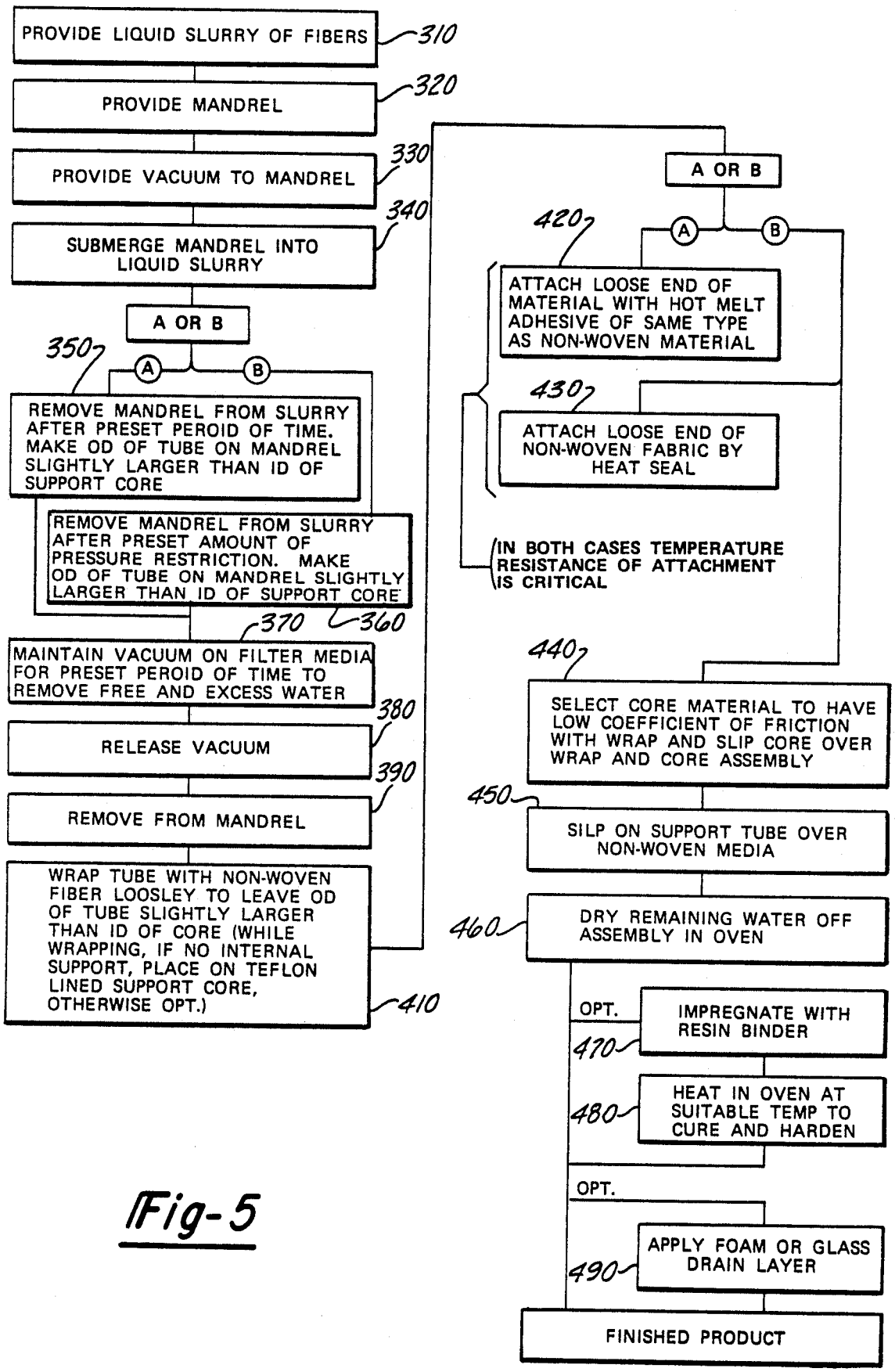
FIG. 5 is a block diagram showing the series of steps necessary to form the construction shown in FIG. 3.
Figure 7:
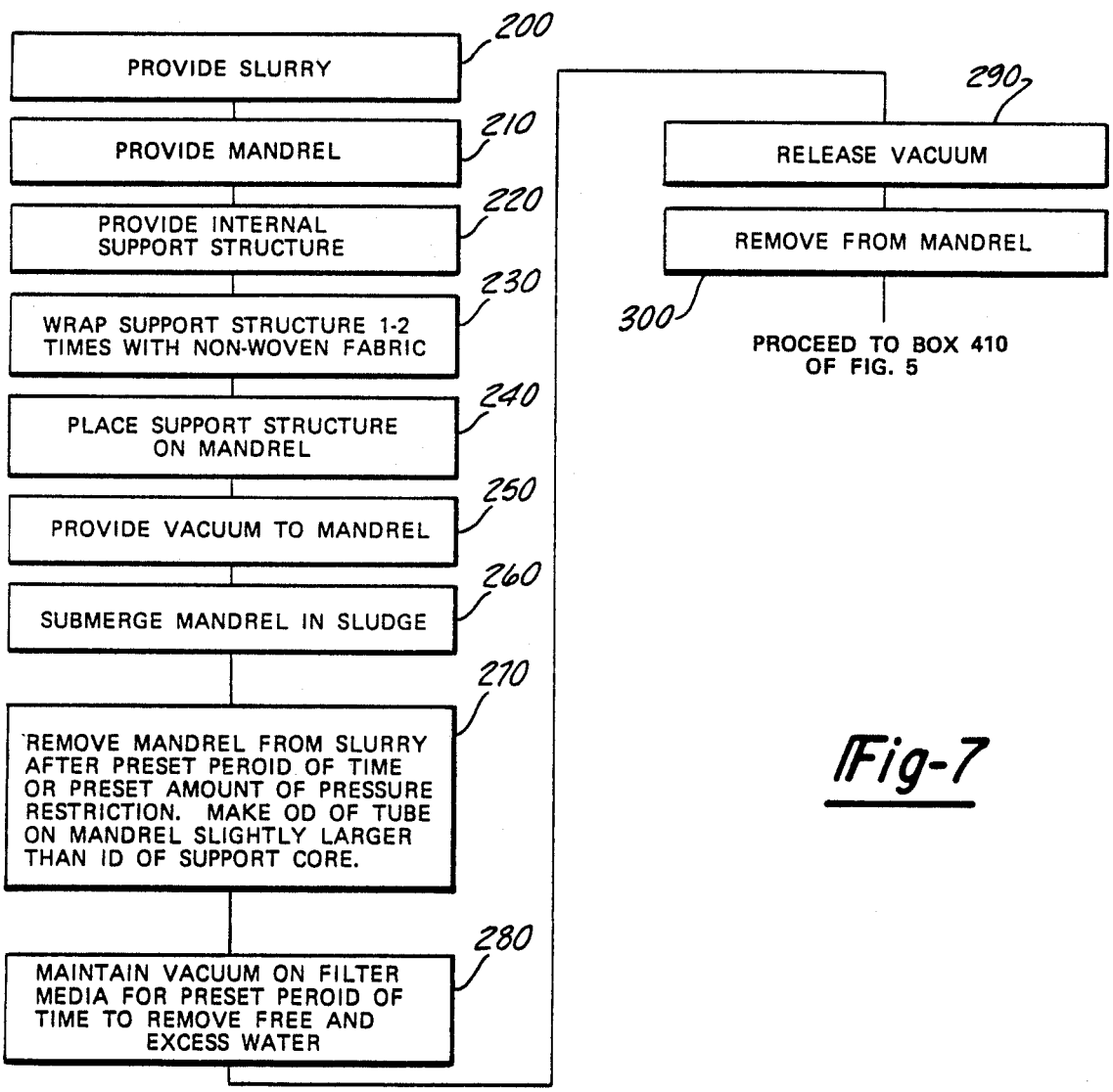
FIG. 7 is a block diagram showing the additional steps necessary, over those shown in FIG. 5, to form the construction shown in FIG. 6.

The method of manufacture of our improved filter tube can be seen by referring to FIGS. 5 and 7.

Whether manufacturing the filter of the present invention with only the outer support structure as shown in FIG. 3, or with the inner support structure 25 and the outer support structure 22 as shown in FIG. 6, the first step is to provide a slurry (Box 200 or Box 310). The manner of preparing the liquid slurry of fibers is well known in the art and need not be described here in detail. The slurry will consist of water and glass fibers and may contain an emulsion binder to give the formed filter additional strength. The slurry will have a proper composition of glass fibers to determine the proper pore size, and will have the proper amount of glass fibers therein for optimum forming time. The amount, by weight, of fibers does not determine the pore size of the filter or effect the same unless outside the generally accepted percentages by weight of fibers to the portion of water used in the slurry. The time of mixing of the slurry does determine the length of the fibers and the smoothness of the outer wall, and should be chosen for optimum production efficiency.

The next step is to provide a mandrel (Box 210 or Box 320) and then connect a suitable vacuum pump to provide vacuum to the mandrel (Box 230 or Box 330). The providing of the mandrel, and the connecting of a vacuum pump to the mandrel are too well known in the art to require discussion herein, except for a few general comments which are important to the particular process being described.

The mandrel may be the same as those commonly used to manufacture tubular vacuum formed filters. The particular size and shape of the mandrel will depend upon the particular size filter tube being manufactured. If the inner support structure 25, is desired (Box 220) this is first wrapped (Box 230) with one or two layers of non-woven media, 21. The free end of the media may be attached to the body of the media, if desired, either by a heat sealing process, or by a hot melt adhesive. If a hot melt adhesive is used, it is preferable that if be of the same type as the nonwoven material. For example, if you are using a nonwoven spun bond polyester material, one would choose a polyester hot melt. While this is preferable, it is not absolutely necessary because in some applications it may be desireable to use differing materials. For example, you could use a polypropylene hot melt with a polyester spun bonded material.

Whether you are using a heat seal technique or a hot melt adhesive technique, the temperature resistance of the means of attachment is critical. If you have a filter tube which will be used at 300 degrees Fahrenheit, you obviously could not use a polypropylene hot melt adhesive which melts at approximately 220 degrees.

It should be understood that it is well within the scope of the invention that the internal support structures 25 could be prewrapped with the nonwoven material to speed the production process and be already prepared for the operator to place on the mandrel (Box 240). It is not necessary to wrap the support structure while it is on the mandrel.

At this stage, whether the inner support structure is being used, or whether we are manufacturing a filter tube with an outer support structure only, a vacuum will be provided to the mandrel by methods well known in the art, which do not need additional description herein.

The submerged mandrel (Box 260 or 340) will be left in the slurry mix for a preset period of time, or until a preset amount of pressure restriction in the vacuum line appears.

The mandrel is then removed from the glass fiber slurry mix and the vacuum is maintained for a preset period of time, (Box 280, 370) depending on the size of the filter tube, to remove free and excess water. After this, the vacuum will be turned off (Box 290, 380) and the assembly so formed will be removed (Box 300, 390) from the mandrel. If the filter assembly is one which had the inner support core 25, it may be handled as it comes off of the mandrel for further operations. If the inner support 25, and the inner layer of nonwoven media 26 are absent, it is preferable to place the raw filter tube on a teflon coated support mandrel while wrapping (Box 410) the tube with the outer layer of the nonwoven media 21. Both the inner layer of nonwoven media 26, and the outer layer of nonwoven media 21, may be such as a spun bonded polyester, polypropylene, or polyolefin, although any nonwoven material may be used.

The use of a nonwoven material is preferred because of the sheet structure of continuous filament fibers randomly arranged, highly dispersed, and bonded at the filament junctions. The spun bonded structure further provides a high tensile and tear strength, excellent stability, no media migration, good chemical resistance and permeability. It is contemplated however, that in some instances a woven material may be suitable, and the use of a woven material is well within the scope of the present invention.

It is important to the process of the present invention that the preset time or preset amount of pressure restriction in the vacuum line be chosen such that the wall thickness of the particular filter being formed, whether it has one or two layers of spun bonded material applied thereon, will be slightly larger than the inside diameter of the outer support structure 22. By "slightly larger" is meant that the filter tube is formed slightly larger than the inside diameter of the retainer by several thousandths of an inch. This, in combination with the nonwoven fiber, which adds several thousandths more of an inch, together are larger than the inside diameter of the retainer. Together they should be larger than the inside diameter of the retainer by approximately ten thousandths to eighty thousandths of an inch, depending upon the application and amount of compression of the media desired.

The outer support structure is seamless, and must be of sufficient rigidity to maintain the radially inward compression on the combination of the nonwoven fiber and the filter tube to properly perform its support function.

It is also important to select the material (Box 440) of which the outer support structure 22, is constructed such that it has a low coefficient of friction with the spun bonded material, such as a polypropylene or polyethylene material. In this way, the outer support structure 22, may be slipped over (Box 450) the combination of the inner support structure 25, inner layer of nonwoven media 26, filter tube 20, and nonwoven media 21, if a filter tube with an inner support structure is used, or over the filter tube 20, and the outer layer of nonwoven material 21, if a filter tube with an outer support only is being formed. Since the outer diameter of the combination of the tube and media is slightly larger than the inner diameter of the outer support structure 22, when the outer support structure 22 is slipped over the combination one will be compressing this assembly from the outside in a radially inward direction to achieve intimate contact between the outer support structure 22, and the outer layer of nonwoven media 21. Because of the strength of the nonwoven media 21, the filter tube 20 will not be able to expand out into the openings in the outer support structure.

Of course, if the inner support 25, and the inner layer of nonwoven media 26 are used, these are also placed in compression so that the filter tube 20 is in intimate contact with the inner layer 26.

To complete the manufacture of the filter assembly it is now taken off the mandrel and may be impregnated with a resin binder (Box 470) by means well known in the art, and is then cured (Box 480) to harden the resin and thus make the filter tube 20, suitable for everyday use.

If desired, a foam or glass drain layer may be applied about the outside of the outer support structure 22 (Box 490), whether or not the previously manufactured assembly has been impregnated with the resin binder and cured.

Thus, by carefully analyzing the problems present in the prior art, and eliminating them by the addition of a layer of nonwoven spun bonded material interposed between an inner or outer support structure and a filter tube, we have provided an improved filter tube and method of manufacturing the same.

We claim:

1. A filter including, in combination:
   (a) a porous filter tube formed of randomly oriented glass fibers,
   (b) at least one layer of a suitable thin sheet material wrapped around said porous filter tube and being in intimate contact therewith, and
   (c) a seamless outer tubular support structure of sufficient rigidity to radially inwardly compress said porous filter tube and said suitable thin sheet material and having an inside diameter slightly smaller than the outside diameter of the combination of the porous filter tube and said outer layer of sheet material and completely surrounding said combination, said support structure having a low coefficient of friction in relation to said suitable thin sheet material thereby holding said combination in compression, and causing said outer layer of sheet material to be in intimate contact at virtually all points of said porous filter.

2. A filter, including in combination;
   (a) a seamless inner tubular support structure,
   (b) an inner layer suitable sheet material wrapped around said tubular support structure,
   (c) a porous filter tube formed of randomly oriented glass fibers,
   (d) at least one outer layer of a suitable thin sheet material wrapped around said porous filter tube, and being in intimate contact therewith; and
   (e) a seamless outer tubular support structure of sufficient rigidity to radially inwardly compress said porous filter tube and said suitable thin sheet material and having an inside diameter slightly smaller than the outside diameter of the combination of said inner tubular support structure, said inner layer of suitable sheet material, said porous filter tube, and said outer layer of suitable sheet material and completely surrounding said combination, said support structure having a low coefficient of friction in relation to said suitable thin sheet material, thereby holding said combination in compression, and causing said outer layer of sheet material to be in intimate contact at virtually all points with said porous filter tube.

3. The filter defined in claim 1, wherein the free end of said outer layer of suitable sheet material is reattached to said layer by a hot melt adhesive.

4. The filter defined in claim 3, wherein said hot melt adhesive is a polyester hot melt.

5. The filter defined in claim 1, wherein said outer support structure is a perforated retaining tube.

6. The filter defined in claim 5, wherein said perforated retaining tube is plastic.

7. The filter defined in claim 5, wherein said perforated retaining tube is metal.

8. The filter defined in claim 5, and further including a drain layer surrounding said outer support structure.

9. The filter defined in claim 8, wherein said drain layer is a porous foam.

10. The filter defined in claim 8, wherein said drain layer is fiber felt.

11. The filter defined in claim 2, wherein said inner layer of suitable sheet material and said outer layer of suitable sheet material both have their free ends reattached by a hot melt adhesive.

12. The filter defined in claim 2, wherein said inner layer of suitable sheet material and said outer layer of suitable sheet material both have their free ends reattached by a heat sealing process.

13. The filter defined in claim 11, wherein said hot melt adhesive is a polyester hot melt.

14. The filter defined in claim 2, wherein said outer support structure is a tubular perforated retaining tube.

15. The filter defined in claim 14, wherein said perforated retaining tube is plastic.

16. The filter defined in claim 14, wherein said perforated retaining tube is metal.

17. The filter defined in claim 14, and further including a drain layer surrounding said outer support structure.

18. The filter defined in claim 17, wherein said drain layer is porous foam.

19. The filter defined in claim 17, wherein said drain layer is fiber felt.

20. A filter assembly comprising a filter as described in either one of claims 1 or 2, and including means for introducing the fluid to be filtered to the interior of said filter at the inside of the innermost filter layer in such a manner that such fluid will flow through remaining layers of said filter, wherein said filter has its ends substantially closed by a pair of closure members, and is mounted inside a suitable filter housing having inlet means sealingly communicating with the interior of said filter, and outlet means communicating with the atmosphere.

* * * * *